United States Patent [19]

Jones, deceased

[11] 4,411,184

[45] Oct. 25, 1983

[54] MUSICAL INSTRUMENT HAVING PROGRAMMABLE AUTOMATIC RHYTHM PATTERN VARIATIONS

[75] Inventor: David A. Jones, deceased, late of Villa Park, Ill., by Diane S. Jones, administrator

[73] Assignee: Marmon Company, Chicago, Ill.

[21] Appl. No.: 371,383

[22] Filed: Apr. 23, 1982

Related U.S. Application Data

[63] Continuation of Ser. No. 163,084, Jun. 26, 1980, abandoned.

[51] Int. Cl.[3] ........................ G09B 15/02; G10H 1/40

[52] U.S. Cl. .................................. 84/1.03; 84/477 R; 84/484; 84/DIG. 12

[58] Field of Search .................... 84/1.03, 477 R, 478, 84/484, DIG. 12

[56] References Cited

U.S. PATENT DOCUMENTS 3,840,691 10/1974 Okamoto ............................. 84/1.03

3,958,483 5/1976 Borrevik et al. ..................... 84/1.03

*Primary Examiner*—Stanley J. Witkowski

*Attorney, Agent, or Firm*—Neuman, Williams, Anderson & Olson

[57] ABSTRACT

An operator programmable rhythm variation system comprises a shift register for storing rhythm variation signals in a sequence specified by the operator. Variation select signals are generated by the operator of the musical instrument and provided to an input/output circuit which converts them to binary coded rhythm variation signals for storage in the shift register. The input/output circuit includes an output data latch, a visual display circuit and a gating circuit for gating the rhythm variation signals to the input of the shift register. The shift register is connected through a gate circuit such that data stored in the shift register can be rotated through the shift register for readout of stored rhythm variation sequences. A controller circuit controls the input/output circuit, the shift register and the gate circuit to store and retrieve rhythm variation signals in the shift register and includes means for setting a standard variation sequence into the shift register in response to a standard/program select signal.

7 Claims, 2 Drawing Figures

MUSICAL INSTRUMENT HAVING PROGRAMMABLE AUTOMATIC RHYTHM PATTERN VARIATIONS

This is a continuation of application Ser. No. 163,084 filed June 26, 1980, and now abandoned.

BACKGROUND OF THE INVENTION

This invention relates to an automatic rhythm system for an electrical musical instrument wherein variations of basic rhythm patterns are automatically introduced at a selectable rate and more particularly, to an electronic organ with an operator programmable arrangement for selecting the order in which selectable variations are introduced.

A number of automatic rhythm programmers are in use which provide electrical pulses for actuating a group of electrical musical voice generators according to repeated preselected rhythmic patterns, e.g., waltz, dixieland, march, etc. Such voice generators comprise known electrical circuits which, when pulsed, produce in conjunction with an audio output system, various untuned musical sounds of the type usually associated with the percussion section of an orchestra. These musical sounds are useful to provide rhythm background accompaniment for an electrical musical instrument such as an electronic organ.

Since such basic rhythm patterns sound monotonous after being played for any length of time, an automatic system for introducing rhythm pattern variations was developed and patented as U.S. Pat. No. 3,958,483 which is assigned to the assignee of the present application. This automatic rhythm varying apparatus provides for prdetermined variations on each basic rhythm pattern available from the musical instrument. The rhythm pattern variations are automatically changed from one to another in a predefined order and at a selectable rate. The apparatus provides for changing the variations in sequential order, that is first variation one, followed by variation two, three, etc. and then repeating the rhythm variations over and over in the same sequential order.

Although providing a great improvement over existing prior art rhythm systems, this apparatus does not provide any control over the sequential order of the variations introduced into the basic rhythm patterns. Thus, although a high proficient player would vary not only the basic rhythm patterns but also the sequential ordering of those variations, such control is not possible on the existing system.

SUMMARY OF THE INVENTION

The present invention provides for operator programmable ordering of the sequences of the variations introduced into any of the basic rhythm patterns available on an electricl musical instrument. The programmed rhythm variations are then automatically repeated in the programmed order at a selectable rate.

The operator programmable rhythm variation system comprises storage means for storing sequences of rhythm variation signals and providing a rhythm variation output signal. The organist generates rhythm variation select signals by activating in a desired sequence a group of variation select switches located on the organ console. The rhythm variation select signals are converted to rhythm variation signals by input/output circuitry. A control circuit operates the input/output circuitry and the storage means to store and retrieve rhythm variation signals in a sequence designated by the operator of the musical instrument. Variation clock signals and an automatic variation signal are generated by existing organ circuitry to activate the control circuit.

BRIEF DESCRIPTION OF THE DRAWING

For a more complete understanding of this invention reference should now be made to the embodiment illustrated in greater detail in the accompanying drawing figures and described below by way of example of the invention. In the drawing.

It should be understood that the invention is not limited to the particular embodiment illustrated herein.

DETAILED DESCRIPTION OF THE ILLUSTRATIVE EMBODIMENT

Figure 1:
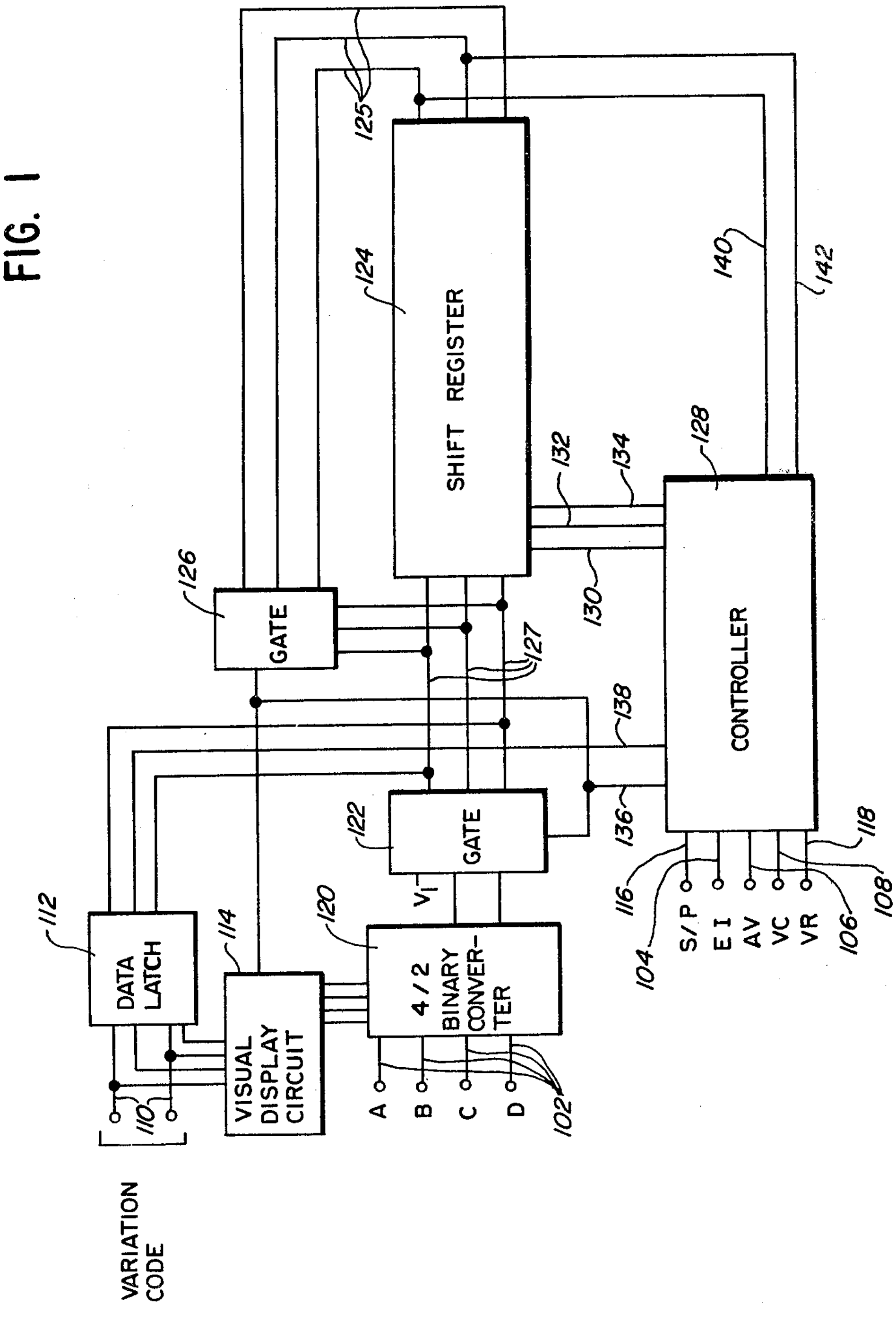
FIG. 1 is a block diagram of a programmable rhythm variation system in accordance with the present invention.

FIG. 1 is a block diagram of an operator programmable variation system in accordance with the present invention. For brevity and ease of description, the operator programmable variation system of the illustrative embodiment will be described as used with the automatic variation system disclosed in U.S. Pat. No. 3,958,483 which is incorporated by reference.

The variation identification inputs A, B, C and D are generated by the operator of the musical instrument on input conductors 102 by operation of rhythm variation select switches (not shown). Whenever one of the variation inputs A, B, C or D is activated an external input signal on the conductor 104 is also activated. The automatic variation system of a musical instrument, e.g., an electronic organ, incorporates the programmable system of the present invention. Whenever the automatic variation system is turned on, an active automatic variation signal is provided on the conductor 106. The automatic variation system of U.S. Pat. No. 3,958,483 provides the variation clock signals for the programmable system on the conductor 108 and the output variation codes provided on the conductors 110 from the data latch 112 drive the variation decoder matrix of the automatic variation system.

The visual display circuit 114 is driven from the data latch 112 and the 4/2 binary converter circuit 120 to provide a visual indication of which rhythm variation is being programmed or played at the present time. The standard/program input signal on the conductor 116 and the variation reset signal on the conductor 118 are generated by control switches or keys (not shown) on an instrument incorporating an automatic variation system including the operator programmable system of the present invention.

The rhythm variation select signals A, B, C and D generated on the conductors 102 are converted to 2 bit binary coded rhythm variation signals by the 4/2 binary convertor circuit 120. The rhythm variation signals are passed from the binary convertor 120 to the gate circuit 122 which is opened or turned on to pass the signals to the shift register 124 for programming variation sequences. In the operator programmable rhythm variation system, the variation signals are stored in the shift register 124 and read out in sequence as they are rotated via the gate circuit 126 through the register 124. The control circuit 128 provides the control signals to the shift register 124, the gate circuits 122 and 126, the data latch 112 and the visual display circuit 114 to perform the storage and retrieval operations on the shift register 124 to program and play rhythm variation sequences.

The shift register 124 of the illustrative embodiment comprises 17 storage locations with each location comprising 3 bits of information. The first bit of information, which is shown as the top bit in the shift register 124 of FIG. 1, is a data present bit. The data present bit is set to a logical "one" or high voltage level if a data word is stored into the second and third bit locations, which are shown as the middle and bottom bits respectively in FIG. 1, of that shift register storage location. When a data word representing a rhythm variation is written into the shift register 124 it passes through the gate 122. When the gate 122 is opened, the first bit is always a one due to the high voltage signal $V_1$ connected to the uppermost input of the gate 122 and the corresponding output lead which receives the high voltage signal when the gate is opened and is connected to the first bit input of the shift register 124.

The 17 storage locations of the shift register 124 provide storage for 16 rhythm variation signals, of course a large or smaller sized shift register could be used The 17th storage location of the shift register 124 provides for the storage of a start of sequence code. The start of sequence code is a logical "zero" or low voltage signal in the first bit location and a one in the second bit location, this signifies to the control circuit 128 that the start of a rhythm variation sequence immediately follows in the shift register 124.

A one on the conductor 116 selects a standard program sequence and generates a momentary preset signal on the conductor 130 which sets a standard sequence referred to as program 1 (PR1) together with a start sequence code into the shift register. For PR1 the farthest right location of the shift register 124 is set to a start of sequence code followed by the rhythm variation code signals for A, B, C and D with the remaining locations being cleared to the extent that they do not contain a data present bit or a start of sequence code in their first and second bit locations.

The control circuit 128 recognizes the start of sequence code and rotates the shift register 124 through the gate circuit 126 such that the A rhythm variation signal is present at the output 125 of the shift register 124. The A variation signal is passed to the input 127 of the shift register 124 via the gate circuit 126 and is latched into the data latch 112 via a signal from the control circuit 128 on the conductor 138. The shift register 124 is then rotated one more storage location. This rotation shifts the start of sequence code one storage location to the right and loads the A rhythm variation signal into the left most storage location of the shift register 124. The B rhythm variation signal is moved into the rightmost or output storage location of the shift register 124 and is available at the input 127 of the shift register 124 via the gate 126. Upon the next activating change of the variation clock signal on the conductor 108, the B rhythm variation signal is latched into the data latch 112 by the control circuit 128. The shift register 124 is then rotated one storage location through the gate circuit 126 such that the B variation signal is in the first storage location and the C variation signal is at the output 125 and input 127 of the register 124 ready to be loaded into the data latch 112. The contents of the other storage locations in the shift register 124 are shifted one storage location to the right.

When all of the rhythm variation signals, i.e., A, B, C and D have been rotated through the shift register such that the D variation signal is stored in the left most position of the shift register 124, the control circuit 128 fails to receive a data present signal from the shift register 124 and rotates the shift register 124 through the gate circuit 126 until a data present signal is present at the output. All rotations of the shift register 124 are performed at a much higher frequency rate than that of the variation clock provided on the conductor 108 and, accordingly, such multiple storage location shifts are readily accomplished between successive activating signals of the variation clock.

Upon encountering the start of sequence code at the output of the shift register 124 the control circuit 128 shifts one more location of the shift register to encounter the data corresponding to the A rhythm variation signal which is then on the output and input of the shift register 124. At the next activating change of the variation clock on the conductor 108 the A rhythm variation signal is loaded into the data latch 112, the shift register 124 is rotated one storage location and the operation progresses as previously described to change the rhythm patterns according to the repetitive sequence A, B, C, D; A, B, C, D; etc.

A zero on the conductor 116 and a one on the conductor 106 prepare the system to be programmed by the operator of the musical instrument. The standard program is not disturbed until a variation select signal is received. The standard sequence is maintained in the shift register 124 to insure that the rhythm patterns are varied by the system if the instrument is placed in the program mode but no rhythm variation sequence is programmed into the system. Otherwise if the program mode was selected but no program was provided, it would appear that the automatic variation system had failed since no variations would be provided for the musical instrument. After the control circuit 128 has been placed in the program mode by operating a standard/program switch to a program position and turning off the automatic variation system, programming is accomplished by activating rhythm variation select switches. If one of the rhythm variation select switches, i.e., A, B, C or D is activated, a signal is generated on the corresponding one of the input conductors 102 and also on the external input conductor 104.

The first activation of the external input signal on the conductor 104 provides a momentary set signal on the conductor 132 which presets a program 2 (PR2) state into the shift register 124 by setting a start of sequence code into the left most storage lcoation of the shift register 124 and clearing the first and second bits of the remaining storage locations of the shift register 124. After this momentary set up of the shift register 124 the rhythm variation signal which was decoded from the rhythm variation select signal provided on one of the conductors 102 is passed to the input of the shift register 124 and the shift register 124 is shifted one location to the right. Thus, the left most location contains the first selected variation code of the program sequence and the second storage location contains the start of sequence code. Each succeeding rhythm variation select signal provided on one of the conductors 102 is similarly shifted into the left most storage location as the storage locations of the shift register 124 are shifted one storage location to the right. The initializing preset PR2 provided on the conductor 132 is inhibited after the first external input signal although an external input signal is provided each time a rhythm variation select signal is generated.

After 16 rhythm variation signals have been programmed by loading them into the shift register 124, the start of sequence code is contained in the right most storage location of the shift register 124 and inhibits any further loading of rhythm variation signals even though additional rhythm variation select signals may be generated by the operator of the musical instrument. Once the operator of the musical instrument desires to play the programmed sequence of variations which have been placed into the system, the variation reset signal on the conductor 118 is activated.

The variation reset signal rotates the start of sequence code to the first storage location via the gate circuit 126 and the data present signal loads the first variation code into the data latch 112 and rotates the next rhythm variation code into the output storage location. The operation of the system is then the same as if the standard sequence was present in the shift register 124 as previously described.

If less than all of the 16 variation code storage locations in the shift register 124 are programmed by the operator of the musical instrument, the shift register 124, in response to the variation reset signal, is rapidly shifted to the right until the start of sequence code is encountered in the right most storage location and then the operation of the system is similar to that described with reference to the standard variation sequence.

Figure 2:
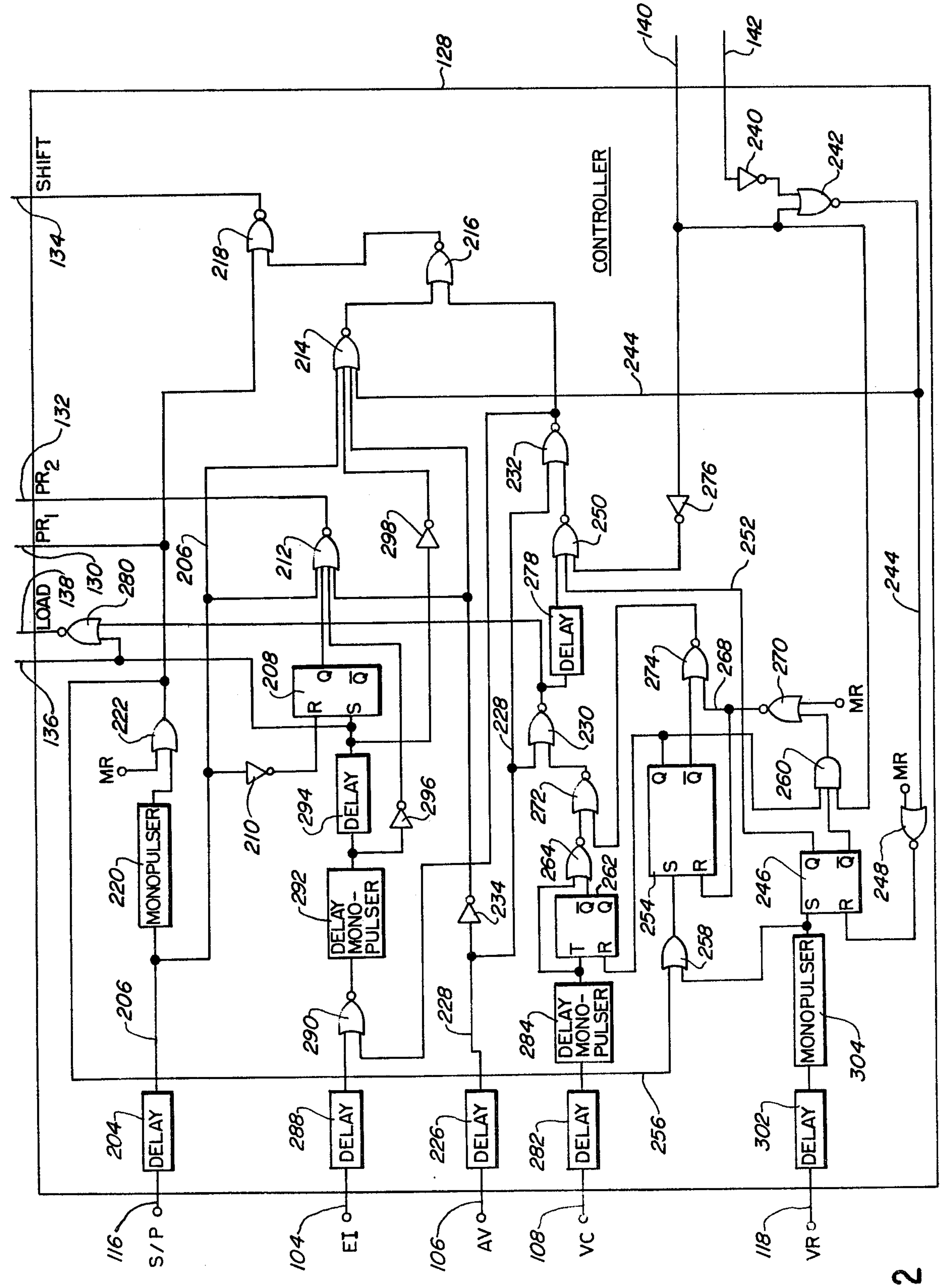
FIG. 2 is a schematic diagram of the control circuit of FIG. 1.

FIG. 2 shows a schematic diagram of the controller circuit 128 of FIG. 1. Initially the operation of the controller 128 will be described for the operation of the programmable variation circuit in the standard mode, i.e., the repetitive sequence A, B, C, D; and then the program mode will be described.

For the standard mode the standard/program signal on conductor 116 is set to a one. The standard/program signal is delayed by the delay circuit 204 which is a clocked delay circuit which is clocked by the same clock signals that control the shifting of the shift register 124. By buffering the input signals to the controller 128 by such a clocked delay circuit, synchronization of the input signals with the operation pf the system are assured. The preferred embodiment of the present invention is implemented in metal oxide silicon (MOS) two phase logic. The implementation of clocked delay circuits as well as the other logic elements referred to in the application is well known to those skilled in the art and will not be described in detail.

After one clock time period has elapsed the signal on the conductor 206 goes to a one to reset the delayed set/reset flip flop 208 via the inverter 210. The output signals of the delayed set/reset flip flop 208 are changed one clock time period after a change of the controlling input signals on the set/reset terminals. The one on the conductor 206 disables the nor gate 212 to insure that a preprogram signal is not generated on the conductor 132 and forces the output of the nor gate 214 to a logical zero to enable the nor gate 216 to control the shift output gate 218 which generates the shift signal for the shift register 124 on the conductor 134. A monopulser 220 generates a short positive going pulse which activates the or gate 222 to generate a PR1 signal on the conductor 130 and preset or initialize the shift register 124 for the A, B, C, D standard sequence as previously described. This short positive going pulse also disables the nor gate 218 to prevent the generation of a shift signal during the presetting of the shift register 124 to the PR1 state.

After the shift register 124 is preset to the PR1 state, the output of the monopulser 220 goes to a logical zero enabling the nor gate 218. The nor gate 216 is similarly enabled by the zero output of the nor gate 214. The automatic variation signal on the conductor 106 is active or at a zero logic level and is delayed by the closed delay circuit 226 to present a zero logic signal on the conductor 228 directly enabling the nor gates 230 and 232 and disabling the nor gates 212 and 214 via the inverter 234. Due to the preset PR1 state in the shift register 124, the output signal from the shift register is a start of sequence code defined by a zero on the data flag condutor 140 and a one on the second or middle data bit conductor 142. The start of sequence code is detected by the combination of the inverter 240 and the nor gate 242 to generate a start of sequence code signal of logic level one on the conductor 244.

The start of sequence code signal on the conductor 244 disables the nor gate 214 and resets the delayed set/reset flip flop 246 via the nor gate 248. The outputs Q and $\overline{Q}$ of the delayed set/rest flip flop 246 change one clock time period after a change in the input signals on the set and reset terminals. The logical zero on the Q output of the flip flop 246 enables the nor gate 250 via the conductor 252. The pulse output of the or gate 222, in addition to performing the functions previously described, also sets the delayed set/reset flip flop 254 via the conductor 256 and the or gate 258. The logical one on the Q output of the delayed set/reset flip flop 254 enables the and gate 260 and resets the toggle flip flop 262 which together with the nor gate 264 serves as a divide by two circuit for the variation clock signal on the conductor 108. The output of the and gate 260 is a zero due to the data flag signal on the conductor 140 and that zero generates a logical one on the conductor 268 via the nor gate 270 which accordingly generates a zero on one input of the nor gate 272 via the nor gate 274. The one output of the $\overline{Q}$ terminal of the toggle flip flop 262 forces the output of the nor gate 264 to a zero.

The zero data flag signal on the conductor 140 through the inverter 276 forces the output of the nor gate 250 to a zero, the output of the nor gate 232 to a one, the output of the nor gate 216 to a zero which generates a shift signal on the conductor 134 via the nor gate 218. The shift register 124 in response to a signal from a high speed clock (not shown) shifts one location to the right which effects a rotation due to the feedback through the gate circuit 126 under the control of the zero signal on the conductor 136 as will be described hereinafter. Upon rotating one location, the start of sequence code is in the left most location of the shift register and the A rhythm variation signal is in the right most storage location of the shift register. The signal on the data flag conductor 140 goes to a one which activates the and gate 260 to generate a zero output on the nor gate 270 resetting the set/reset flip flop 254 one clock time period later and, together with the zero output on the $\overline{Q}$ output of the set/reset flip flop 254, generates a one on the output of nor gate 274 which generates a zero output for the nor gate 272 generating a one output to the delay circuit 278 and the nor gate 280. The output signal of the nof gate 280 goes to a zero which loads the A rhythm varlation signal which was present at the input of the shift register 124 via the gate circuit 126 into the data latch 112.

The logical one state of the data flag on the conductor 140 disables the shift signal on the conductor 134 via the inverter 276 the nor gates 250, 232, 216 and 218. After one clock time period, the set/reset flip flop 254 is reset driving the output of the nor gate 274 to a zero, the output of the nor gate 272 to a one and the output of the nor gate 230 to a zero removing the load signal on the conductor 138. The previous one signal on the output of the nor gate 230 passes through the clocked delay circuit 278 and activates the shift signal on the conductor 134 via the nor gates 250, 232, 216 and 218 to shift the A rhythm variation signal from the right most storage location of the shift register 124 to the left most storage location and place the B rhythm variation signal at the output of the shift register 124. After one clock delay the shift signal is again disabled by the delayed zero signal through the clocked delay circuit 278.

After many cycles of the clock circuit (not shown) which drives the shift register 124 and the delayed logic circuitry of the programmable rhythm variation system, the variation clock signal changes state on the conductor 108. This signal is delayed by the clocked delay circuit 282 and drives the delayed monopulser 284 which provides a short zero pulse one clock time period after receiving an input signal. The output signal from the delayed monopulser 284 drives the divide by two circuit comprising the toggle flip flop 262 and the nor gate 264 to provide an output signal on the output of the nor gate 264 for every two clock pulses of the variation clock signal on the conductor 108. The pulse output signal on the nor gate 264 generates a load signal on the conductor 138 via the nor gates 272, 230 and 280 and drives the clocked delay circuit 278. After the next rhythm variation signal is loaded into the data latch 112 from the output of the shift register 124 through the gating circuitry 126, the output of the clocked delay circuit 278 becomes active to generate the shift output signal on the conductor 134 via the nor gates 250, 232, 216 and 218. Accordingly the contents of the shift register 124 are rotated one storage location through the gate circuit 126.

After the D rhythm variation signal has been rotated from the output end of the shift register 124 into the input end of the shift register, the data flag signal goes to a zero. The zero data flag signal activates the shift signal on the conductor 134 via the inverter 276 and the nor gates 250, 232, 216 and 218 to rotate the shift register 124 until a data flag is encountered. Thus, the rotation will continue until the A rhythm variation signal is shifted into the right most storage location of the shift register 124 since the other storage locations are empty or contain the start of sequence code which is only used to initialize the sequence. The A, B, C, D sequence will then be repeated as previously described as long as desired.

To program a sequence of rhythm variations, the standard/program signal on the conductor 116 is set to a zero and the automatic variation signal on the conductor 106 is set to a one. These signals enable the nor gates 212 and 214, remove the hard reset from the delayed set/reset flip flop 208 and disable the nor gates 230 and 232. The standard sequence, PR1, will have been previously set into the shift register 124 either by a selection of the standard sequence by placing the standard/program switch into the standard position or by the master reset MR signal which is momentarily one to initialize the circuit when the musical instrument is turned on. In any event if no rhythm variation select switch is activated to generate a rhythm variation select signal on one of the conductors 102, no change in the contents of the shift register 124 will take place. Under these circumstances if automatic variation is reactivated the A, B, C, D sequence will still be provided regardless of the fact that the standard/program switch has been set to the program mode.

When one of the rhythm variation select switches A, B, C or D has been activated, a variation select signal is passed to the 4/2 binary converter 120 and a zero signal is generated on the external input signal conductor 104. The external input signal is delayed by the clocked delay circuit 288 for synchronizing reasons and passed to the nor gate 290 whose other input signal is at a zero if the automatic variation signal has been turned off. A one signal is provided to the delayed monopulser 292 and after a delay of one clock time period a high pulse is provided on its output to the clocked delay circuit 294 and the inverter 296. The inverter 296 drives the nor gate 212 to provide a preset PR2 signal on the conductor 132 to set a start of sequence code in the left most storage location of the shift register 124 and clear at least the first and second data bits of all of the remaining storage locations in the shift register 124 as previously described.

After one clock time period delay, the output of the delay circuit 294 opens the gate circuit 122 to pass the rhythm variation signal corresponding to the activated rhythm variation select switch to the input of the shift register 124, loads the rhythm variation signal into the latch 112 and deactivates the gating circuit 126 and the visual display circuit 114. The output pulse from the delay circuit 294 also sets the delayed set/reset flip flop 208 to disable the nor gate 212 after one clock time period. The output of the delay circuit 294 also activates the nor gate 214 via the inverter 298 to generate a shift signal on the conductor 134 via the nor gates 216 and 218. This shift signal shifts the contents of the shift register 124 one location to the right such that the start sequence code is in the second storage location and the first rhythm variation signal as coded by the converter 120 and passed by the gate circuit 122 is loaded into the left most shift register storage location. The programmed rhythm variation code just entered is also displayed by the visual display circuit 114 once the output of the delay circuit 294 returns to a zero.

Each succeeding rhythm variation select switch which is activated also generates an external input signal on the conductor 104 and, via logic operations as just described, loads the corresponding rhythm variation signal into the data latch 112, opens the gate 122, closes the gate 126 and shifts the rhythm variation signals on the input to the shift register 124 into the left most storage location of the shift register 124 with all other locations being shifted to the right by one storage location. This operation continues until a desired rhythm variation sequence has been loaded into the shift register 124. If a complete sequence of 16 rhythm variation signals are loaded into the shift register 124 the start of sequence code is shifted into the output location of the shift register 124 and disables the shift signal on the conductor 134 via the inverter 276 and the nor gates 250, 232, 216 and 218. If less than 16 rhythm variation signals are loaded into the shift register 124 those signals are located in the left hand storage locations. In either event after the desired sequence has been loaded into the shift register 124, the operator activates a variation reset switch or key (not shown) to generate a logical one variation reset signal on the conductor 118.

The variation reset signal on the conductor 118 is delayed by the clocked delay circuit 302 for sequencing reasons and passed to the monopulser circuit 304. The output of the monopulser circuit 304 sets the delayed set/reset flip flop 246 to force the output of the nor gate 250 to a zero. When it is desired to start playing the recorded sequence which was programmed by the operator of the musical instrument, the automatic variation signal is changed to a zero on the conductor 106. This drives the other input of the nor gate 232 to a zero activating the shift signal on the conductor 134 via the nor gates 216 and 218. The shift register 124 is shifted to the right until the start of sequence code is shifted into the right most storage location where it is detected by the inverter 240 and the nor gate 242 which generate a start of sequence signal. The start of sequence signal resets the set/reset flip flop 246 via the nor gate 248 and prepares for the rotate operation of the start of sequence code from the right most storage location to the left most storage location of the shift register 124 in conjunction with the set/reset flip flop 254 as previously described with reference to the standard rhythm variation sequence. If the full complement of 16 rhythm variation signals have been loaded into the shift register 124 the start of sequence code is in the right most location of the shift register 124 and resets the set/reset flip flop 246 to initilize the circuit as previously described.

In accordance with the above teachings, it will be apparent that a programmable variation system has been described for use in an electrical musical instrument which automatically generates a number of variations for each of the basic rhythm patterns in a rhythm section of the electrical musical instrument. The invention provides for the programming of rhythm variations in any desired sequence which is repetitively applied to the rhythm patterns. A single illustrative embodiment has been disclosed; however, in view of the above teachings, various embodiments and alterations of the invention will be apparent to one of ordinary skill in the art area involved. For example, additional shift register storage locations can be provided for longer programmable sequences, other storage arrangements can be provided and the control circuit can be embodied in any one of a large variety of circuits including microprocessor circuits. Of course the entire arrangement can be embodied in software as an operating program for a computer. Applicant considers these and other modifications and embodiments to be equivalents of his invention and within the true spirit and scope of the invention as claimed in the following claims.

What is claimed is:

1. In an electrical musical instrument having an automatic rhythm system which varies rhythm patterns in response to rhythm variation signals, rhythm variation select signals, variation clock signals to control the rate of change of said rhythm variations and an automatic variation signal, an operator programmable rhythm variation system comprising:
   storage means for storing sequences of rhythm variation signals in response to said rhythm variation select signals;
   input/output means comprising:
      a binary coded output converter for receiving said rhythm variation select signals and generating said rhythm variation signals;
      gating means having an input connected to said converter and an output connected to said storage means for gating said rhythm variation signals to said storage means; and
      a data latch connected to the output of said gating means for storing the instant rhythm variation signal being played or programmed; and
   control means responsive to said variation clock signals, said rhythm variation select signals and said automatic variation signal to control said input/output means and said storage means to store and retreive rhythm variation signals in said storage means.

2. The operator programmable rhythm variation system of claim 1 wherein said storage means comprises a shift register.

3. The operator programmable rhythm variation system of claim 1 wherein said input/output means further comprises visual display means connected to said converter and said data latch for displaying the instant rhythm variation being played or programmed.

4. The operator programmable rhythm variation system of claim 2 further comprising gating means responsive to a gating control signal generated by said control means for selectively gating the output of said shift register to the input of said shift register.

5. The operator programmable rhythm variation system of claim 1 further comprising a standard program control signal wherein said control means is responsive to said standard program control signal to set a predefined rhythm variation sequence into said storage means.

6. The operator programmable rhythm variation system of claim 5 wherein said control means is responsive to said standard program control signal and an initial one of said rhythm variation select signals to initialize said storage means and store the corresponding initial rhythm variation signal and any subsequent rhythm variation signals into said storage means.

7. The operator programmable rhythm variation system of claim 6 further comprising a variation reset signal wherein said control means in response to said variation reset signal advances said storage means to said initial rhythm variation signal and thereafter repeatedly accesses all rhythm variation signals programmed into said storage means at a rate determined by said variation clock signals.

* * * * *